United States Patent
Tan et al.

(10) Patent No.: US 8,611,707 B2
(45) Date of Patent: Dec. 17, 2013

(54) SYSTEM AND METHODS FOR ROUTING OPTICAL SIGNALS

(75) Inventors: Michael Renne Ty Tan, Menlo Park, CA (US); Huei Pei Kuo, Cupertino, CA (US); Paul Kessler Rosenberg, Sunnyvale, CA (US); Eric Peterson, McKinney, TX (US); Gary Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/143,899

(22) PCT Filed: Jan. 9, 2009

(86) PCT No.: PCT/US2009/030666
§ 371 (c)(1),
(2), (4) Date: Jul. 8, 2011

(87) PCT Pub. No.: WO2010/080159
PCT Pub. Date: Jul. 15, 2010

(65) Prior Publication Data
US 2011/0274391 A1  Nov. 10, 2011

(51) Int. Cl.
*G02B 6/26* (2006.01)
(52) U.S. Cl.
USPC .......................................... 385/27
(58) Field of Classification Search
USPC .................................. 385/15, 27, 28
See application file for complete search history.

(56) References Cited

U.S. PATENT DOCUMENTS

| | | | |
|---|---|---|---|
| 4,688,892 | A | 8/1987 | Laakmann |
| 4,688,893 | A | 8/1987 | Laakmann |
| 5,170,448 | A | 12/1992 | Ackley et al. |
| 5,379,354 | A | 1/1995 | Jenkins |
| 5,396,570 | A | 3/1995 | Jenkins et al. |
| 5,525,190 | A | 6/1996 | Wojnarowski et al. |
| 5,562,838 | A | 10/1996 | Wojnarowski et al. |

(Continued)

FOREIGN PATENT DOCUMENTS

| | | |
|---|---|---|
| CN | 1643413 A | 7/2005 |
| JP | 2003308704 | 10/2003 |
| JP | 2008300194 | 12/2008 |

OTHER PUBLICATIONS

European Search Report (extended), EP Application No. 09837744.3, Jun. 27, 2012.

(Continued)

*Primary Examiner* — Jennifer Doan

(57) ABSTRACT

A system (10) and methods (800, 900) for routing optical signals are disclosed. The system includes a large core hollow waveguide (30) having a reflective coating (40) covering an interior surface (32) of the hollow waveguide configured to guide a light beam (104). At least one area based beam splitter (50) is integrally formed with the hollow waveguide and has an angled reflective surface (52) with a selectable height (H) relative to the interior surface. The angled reflective surface is oriented to redirect a predetermined amount of the light beam (114) based on the height of the angled reflective surface.

18 Claims, 10 Drawing Sheets

(56) References Cited

U.S. PATENT DOCUMENTS

| | | |
|---|---|---|
| 5,737,458 A | 4/1998 | Wojnarowski et al. |
| 5,786,925 A | 7/1998 | Goossen et al. |
| 7,477,809 B1 * | 1/2009 | Tan et al. ............ 385/14 |
| 2003/0205065 A1 | 11/2003 | Matsuura et al. |
| 2005/0089262 A1 | 4/2005 | Jenkins et al. |
| 2006/0171626 A1 | 8/2006 | McNie et al. |
| 2006/0215954 A1 | 9/2006 | Jenkins |
| 2011/0164875 A1 * | 7/2011 | Bicknell et al. ......... 398/43 |

OTHER PUBLICATIONS

Marcatili, et al., "Hollow Metallic and Dielectric Waveguides for Long Distance Optical Transmission and Lasers", The Bell System Technical Journal, Jul. 1964, pp. 1783-1809.

Mohebbi, et al., "Silver-coated hollow-glass waveguide for applications at 800 nm" Applied Optics, Nov. 20, 2002, vol. 41, No. 33, pp. 7031-7035.

Search Report, CN Patent Application No. 200980157956.X.

* cited by examiner

SYSTEM AND METHODS FOR ROUTING OPTICAL SIGNALS

BACKGROUND

As computer chip speeds on circuit boards increase to ever faster speeds, a communications bottleneck in inter-chip communication is becoming a larger problem. One likely solution is to use glass fibers to interconnect high speed computer chips. However, most circuit boards involve many layers and often require tolerances in their manufacture of less than a micron. Physically placing glass optical fibers and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven illusive, despite the need for broadband data transfer.

DETAILED DESCRIPTION OF EXAMPLE EMBODIMENTS

Figure 1:
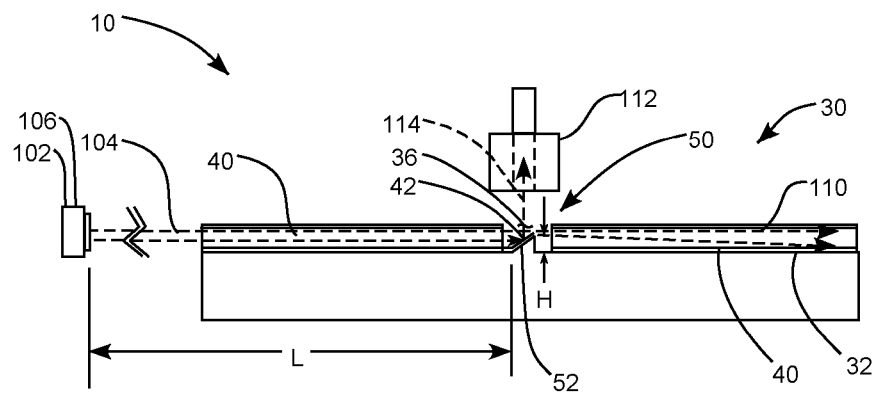
FIG. 1 is an illustration of a system for routing optical signals having a large core hollow waveguide coupled to a light beam source in accordance with an embodiment of the present invention, and showing a beam splitter integrally formed with the waveguide.

One method for forming optical interconnects between computer chips on a circuit board is to use optical waveguides formed on the circuit board. Optical waveguides can be superior to glass optical fiber communications because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide(s) may be formed on a flexible substrate to create a ribbon cable having one or more optical waveguides.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides typically experience significantly more loss than glass optical fibers. Indeed, the amount of loss in on-board waveguides has been one of the factors limiting the acceptance of optical waveguide interconnects. Polymers used to construct the waveguides can have a loss of 0.1 dB per centimeter. In contrast, the loss in a glass optical fiber is around 0.1 dB per kilometer. Thus, polymer waveguides can have losses that are orders of magnitude greater than the loss in glass optical fibers.

In addition, typical waveguides are usually manufactured to have dimensions that are roughly proportional with the wavelength of light they are designed to carry. For example, a single mode waveguide configured to carry 1000 nm light may have a dimension of 1000 nm to 9000 nm (1 μm to 9 μm) for the higher index core region and surrounded by a lower index cladding region. Multimode waveguides may have larger dimensions on the order of 20-60 um for the core region. Both single and multimode waveguides have a relatively high numerical aperture (NA) of around 0.15 to 0.25 for a core and clad refractive index difference of 0.01 to 0.02. The numerical aperture determines the divergence of beam from the emitting fiber. A larger NA will result in a faster deterioration of the coupling efficiency as the fiber to fiber separation increases. Thus, connecting waveguides of this type can be expensive and challenging.

Splitting and tapping of the guided optical beams are also difficult to accomplish using these waveguides because the splitters must be precisely inserted into the waveguides at 45 degrees. Additionally, the amount of power coupled out requires control of the optical coatings deposited on the beam splitter. The beam splitters also need to be thin to prevent lateral shift of the light beam which will increase the excess loss for each tap. Thus, the cost of creating and connecting waveguides with beam splitters and taps has historically reduced their use in most common applications. In accordance with one aspect of the invention, it has been recognized that an inexpensive waveguide with a beam splitting device is needed that is simpler to connect with optical taps and other optical devices and that can significantly reduce the manufacturing costs and efficiency losses of traditional waveguides.

Figure 2:
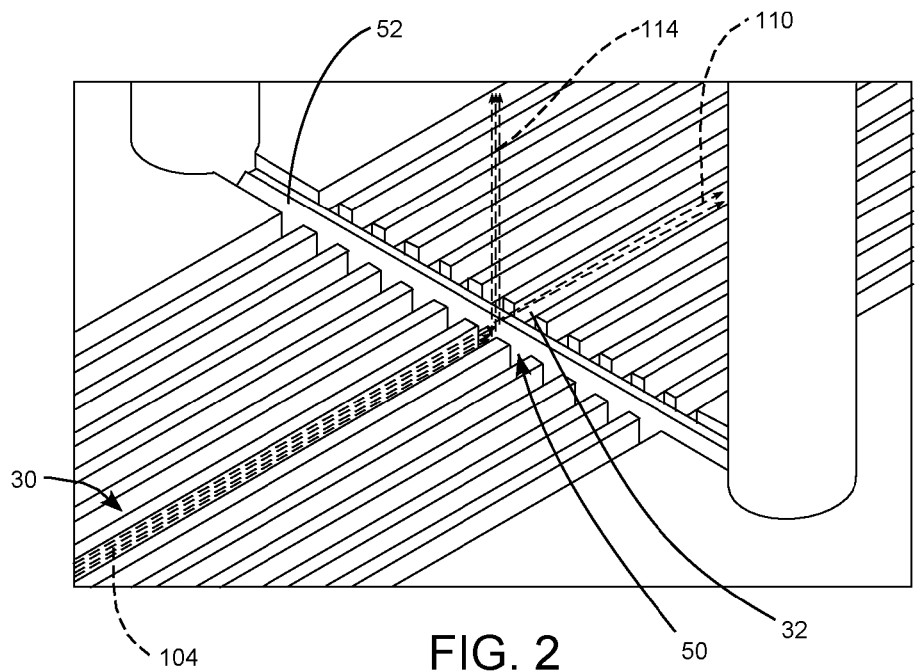
FIG. 2 is perspective illustration of the system of FIG. 1.

In accordance with an embodiment of the present invention, FIGS. 1-2 illustrates a system for routing optical signals, indicated generally at 10 including a large core hollow waveguide, indicated generally at 30. A collimating lens 106 may be used to couple the light beam into the hollow core waveguide. It will be appreciated that collimated light has lower losses in the hollow core waveguide because the light rays travel parallel to the axis of the wave guide. Loss in glass optical fibers depends on how much interaction the light has with the reflective metal walls. Ideally, the hollow core waveguide will have as low a number of bounces as possible.

The large core hollow waveguide can include at least one area based beam splitter, indicated generally at 50, that is integrally formed with the large core hollow waveguide.

The use of the term large core hollow waveguide is intended to mean a waveguide with a diameter (or width and/or height) substantially greater than a wavelength of the light that is directed in the waveguide. For example, the diameter (or width and/or height) can be on the order of 50 to 150 or more times greater than a wavelength of the light beam the waveguide is configured to guide.

The large core hollow waveguide can have a cross-sectional shape that is square, rectangular, round, elliptical, or some other shape configured to guide an optical signal, such as a light beam. Furthermore, because the waveguide is hollow, the optical beam essentially travels at the speed of light in air or a vacuum. Large core hollow waveguides are a substantial improvement over traditional optical waveguides formed using polymers or dielectric materials.

Returning to FIGS. 1-2, a light source 102 is shown emitting a light beam 104 into the waveguide 30. The beam splitter 50 is used to redirect a portion of the light beam, referred to as the reflected beam 114 into a mating connector 112 or waveguide. The remaining light, referred to as the transmitted beam 110, can continue in the same direction as the original beam 104. The light beam may bounce between the walls of the waveguide. At each reflection, a substantial loss of the beam may occur.

In order to decrease loss within the waveguide, a reflective coating 40 may be added to cover an interior surface 32 of the waveguide 30. The reflective coating can be formed using a plating, sputtering, or similar process, as can be appreciated. If the hollow waveguide includes a polymer or other material with a low melting point, the reflective coating may be applied using a low temperature process such as sputtering, electroplating or thermal evaporation.

A collimating lens 106 may be used to couple the light beam into the hollow metal waveguide 30. The lens 106 acts to restrict the light rays coupled into the waveguide to be nearly parallel to the side walls of the wave guides, thereby minimizing the number of reflections or bounces seen by the light. Even though the reflectivity of the walls may be high (ie greater than 98%), it is still important to reduce the number of reflections to a minimum since 20 bounces would reduce the intensity of the ray to 67% of its initial intensity.

The reflective coating 40 can include one or more layers of metal, dielectrics, or other materials that are substantially reflective at the wavelength of the light. The metals can be selected based on their reflectivity. A highly reflective layer covering the channel is desired. For example, the reflective coating may be formed using silver, gold, aluminum, or some other metal or alloy that can form the highly reflective layer.

Alternatively, the reflective coating may be a dielectric stack which can be formed from one or more layers of dielectric material that is substantially reflective at a selected wavelength. Before the reflective coating is deposited, the uncoated hollow channel of the waveguide may be smoothed to remove any surface roughness. The reflective coating may also undergo a smoothing process to remove surface roughness in the reflective layer that may occur during the deposition process. For example, heat may be applied for smoothing or electro-polishing may be used to smooth out the reflective surface. Additionally, a substantially transparent protective layer, such as silicon dioxide, can be formed over the reflective coating to act as a protective layer.

Significant losses can occur within a waveguide if the optical pathway through the waveguide is not substantially straight. Bends or turns that occur in the waveguide can cause the light to have an unwanted number of reflections or bounces, causing a substantial amount of attenuation or loss. To enable optical signals to be routed in a different direction, the at least one area based beam splitter 50 can be integrally formed within the hollow waveguide 30 to redirect the light beam 104. In accordance with the embodiment shown in FIGS. 1-2, the system 10 can include a single beam splitter 50, although it will be appreciated that more beam splitters can be used as desired.

The beam splitter 50 can have an angled reflective surface 52 that can be sized and oriented with respect to the direction of travel of the light beam in the waveguide to redirect a predetermined amount of the light beam. The angled reflective surface 52 can extend at least partially into the channel of the waveguide 30 from the interior surface 32. The angled reflective surface 52 can have an adjustable or selectable height, H, relative to the interior surface that can determine the area of the angled reflective surface. More specifically, the height H of the beam splitter 50 can be selected when the waveguide is formed and the selection of the height H can be based on the amount of light desired to be redirected by the beam splitter. If more of the light beam is desired to be redirected then the height H can be increased which results in an overall increase in area of the angled reflective surface which intersect the optical beam. If less of the light beam is needed then the height can be decreased which results in an overall decrease in area of the angled reflective surface which intersect the optical beam. In this way, the amount of light redirected by the beam splitter is based on the area of the angled reflective surface of the beam splitter which is adjusted or selected at the time the waveguide is formed.

Figure 3:
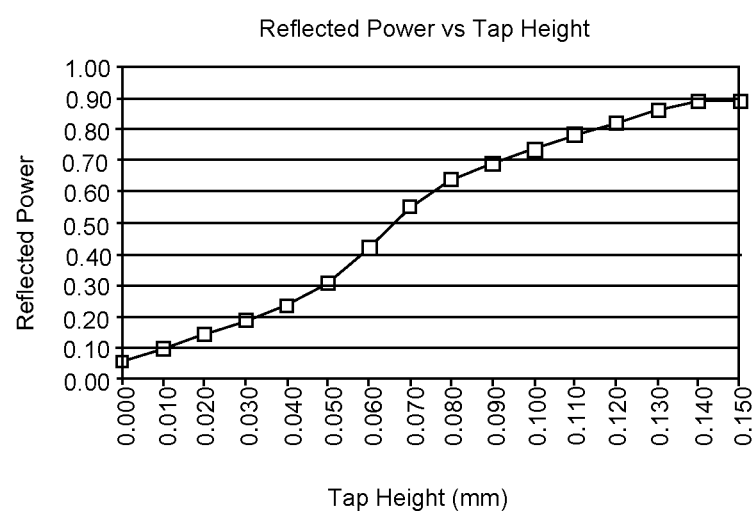
FIG. 3 is a plot of reflected power versus tap height for the beam splitter of the system of FIG. 1.

FIG. 3 shows a plot that compares the percentage of power of the reflected light beam 114 as a function of the height H of the angled reflective surface 52 with a single reflective coating 42 applied to the angled reflective surface. The plot shows the embodiments of the beam splitter described herein can have a reflectivity range from approximately 0 to 89% of the power of the light beam 104 with a single reflective coating. The plot also shows that as the height of the angled reflective surface increases, the power of the reflected light beam also increases.

Turning again to FIGS. 1-2, in addition to being able to adjust or select a desired height H of the beam splitter 50, the longitudinal distance L of the beam splitter with respect to the light source 102 can also be adjusted or selected based on the desired location of the reflected beam 114. It will be appreciated that to keep the reflected light beam substantially centered with the connector 112, the angled reflective surface may be moved in both the longitudinal or X-direction, and in height, or the Z-direction. Moving the surface in the Z-direction only may lead to displacement of the reflected beam at the connector. Thus, as the height H of the beam splitter is raised or lowered, the longitudinal location L can be selected to be farther or closer to the light source so as to position the reflected beam at a desired location. In this way, the reflected beam can be aligned with a mating connector 112, such as an optical tap.

The hollow waveguide 30 and the beam splitter 50 can be formed integrally together as a single monolithic component in a single manufacturing process. In this way, the beam splitter need not be placed in the waveguide in a separate manufacturing step.

It will be appreciated that placement of a separate beam splitter or optical tap into a waveguide after fabrication of the waveguide requires careful, time consuming precision in order to redirect the reflected light beam with sufficient accuracy. Thus, advantageously, forming the beam splitter 50 integrally with the waveguide 30 allows higher precision which improves the efficiency of the beam splitter or optical tap. Additionally, an efficient and relatively inexpensive manufacturing process such as injection molding, embossing, etching, powder blasting, dicing, extruding, rolled hot forming, and the like may be used to fabricate the waveguide and the integrated beam splitter. Such manufacturing processes also provide high repeatability when manufacturing multiple waveguides. Thus, integrally forming the beam splitter with the waveguide also facilitates mass production of the waveguides. Other manufacturing methods known in the art may also be used.

Forming the beam splitter 50 integrally with the waveguide also allows the beam splitter 50 to have a wide variety of geometric configurations. For example, the angle of the angled reflective surface 52 of the beam splitter 50 can be formed at a predetermined angle between approximately 30 and 60 degrees with respect to a direction of travel of the light beam 104 in the hollow waveguide 30. The angle of the angled reflective surface with respect to the direction of travel of the light beam redirects the predetermined reflected amount of the light beam at an angle of between approximately 60 and 120 degrees with respect to the direction of travel of the light beam in the hollow waveguide. Thus, a beam splitter 50 with an angled reflective surface of 45 degrees can redirect the light beam at an angle of 90 degrees, as shown in FIG. 1. Similarly, an angled reflective surface with an angle of 30 degrees can redirect the light at an angle of 60 degrees and an angled reflective surface with an angle of 60 degrees can redirect the light at an angle of 120 degrees. In this way, the light beam 114 reflected by the beam splitter can be directed to a connector coupled to the beam splitter at a variety of angles.

Figure 4:
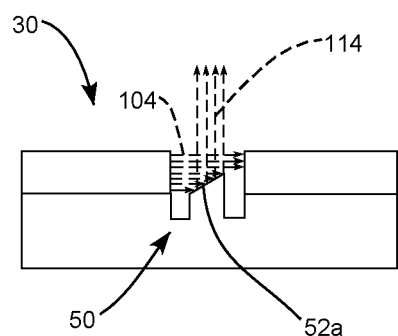
FIG. 4 is an illustration of the system of FIG. 1 with a beam splitter having a relatively narrower beam splitter.
Figure 5:
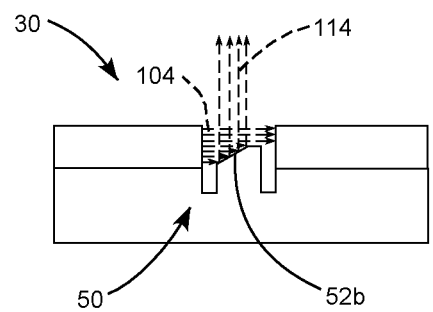
FIG. 5 is an illustration of the system of FIG. 1 with a beam splitter having a relatively wider beam splitter.
Figure 6:
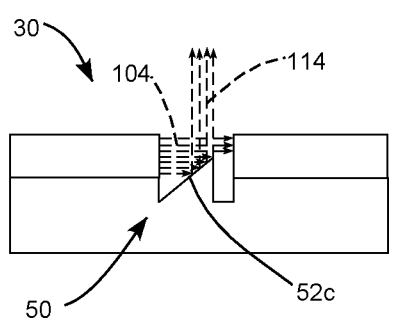
FIG. 6 is an illustration of the system of FIG. 1 with a beam splitter having an angled surface extending below the waveguide.
Figure 7:
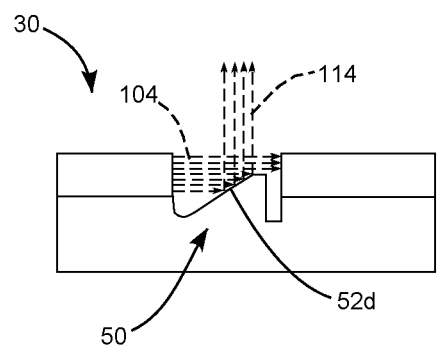
FIG. 7 is an illustration of the system of FIG. 1 with a beam splitter having a curved surface extending below the waveguide.

Other geometric variations can include a waveguide 30 with an angled reflective surface 52a with a relatively shorter longitudinal length than the angled surface 52 shown in FIG. 1, for the beam splitter 50, as shown in FIG. 4; a waveguide 30 with a relatively longer longitudinal length angled reflective surface 52b than the angled reflective surface shown in FIG. 4 for the beam splitter 50 with an upper surface 54 parallel to the direction of travel of the light beam 104, as shown in FIG. 5; a waveguide 30 with an angled surface extending below the lower surface of the waveguide for the beam splitter 50, as shown in FIG. 6; and a waveguide 30 with a curved surface extending below the lower surface of the waveguide for the beam splitter 50, as shown in FIG. 7. Each of these variations can serve functional or fabrication purposes. For example, the upper surface parallel to the direction of travel of the light beam shown in FIG. 4 can reduce diffraction and scattering of the light beam caused by sharp edges or corners. Similarly, the surfaces extending below the lower surface of the waveguide shown in FIGS. 5 and 6 can have rounded corners or corners that are not in the direct path of the light beam so as to minimize unwanted reflections which would cause losses in the beam due to unwanted scattering.

The waveguide 30 can also include a substantially transparent aperture 36 within the hollow waveguide. The aperture 36 can allow substantially all of the reflected light beam 114 redirected by the angled reflective surface 52a-c to be transmitted through the aperture.

Figure 8:
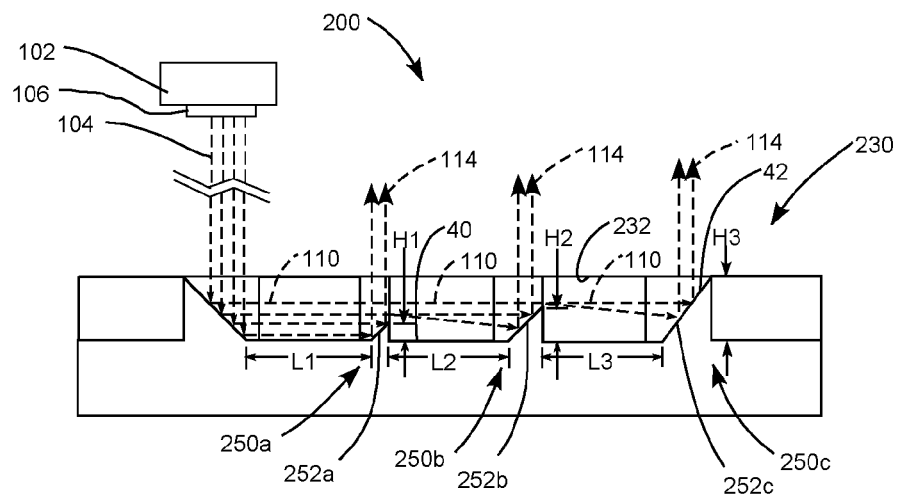
FIG. 8 is side view illustration of a system for routing optical signals having a plurality of large core hollow waveguides coupled to a light beam source in accordance with another embodiment of the present invention, and showing a plurality of beam splitters integrally formed with the waveguides.
Figure 9:
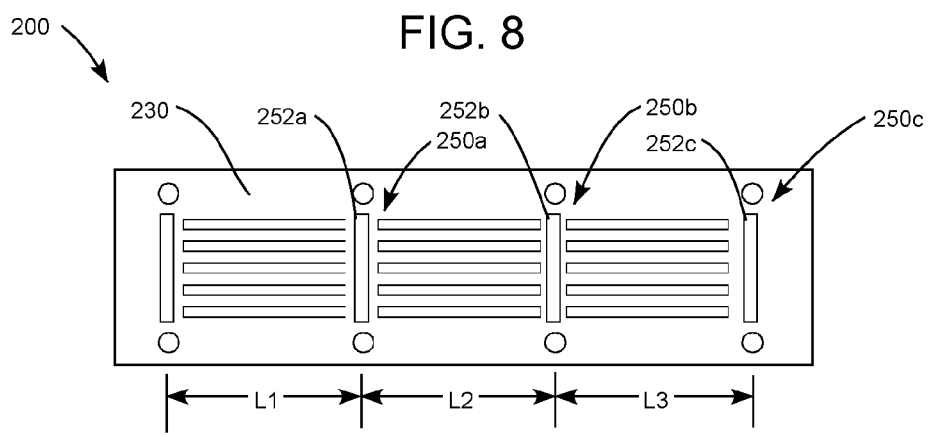
FIG. 9 is a top view illustration of the system of FIG. 8.

As illustrated in FIGS. 8-9, a system for routing optical signals, indicated generally at 200, is shown in accordance with another embodiment of the present invention. The system 200 can have a large core hollow metal waveguide, indicated generally at 230, similar in many respects to the optical system 10 described above and shown in FIGS. 1-6. Thus, the waveguide 230 can receive light 104 from a light source 102, and direct the light towards a beam splitter.

Additionally, a collimator can be placed within a path of the light beam from the light source to overcome the attenuation of higher modes emitted from the light source. The collimator can be a collimating lens 106 such as a ball lens with an anti-reflective coating. The collimator is configured to collimate the light beam into a parallel or paraxial beam before it enters the large core hollow waveguide 230. In this way, the beam just grazes the reflective layer suffering only a few bounces as it propagates within the waveguide. The collimator provides that substantially any reflections that do occur will typically be at a relatively shallow angle with respect to the waveguide walls, thus minimizing the number of reflections within the waveguide and therefore reducing the attenuation of the light within the hollow waveguide. As a result, the low loss mode propagating in the hollow waveguide has an extremely small numerical aperture. This property allows the insertion of optical splitters into these waveguides with little excess loss.

In the embodiment shown in FIGS. 8-9, the waveguide 230 can include a plurality of beam splitters 250a, 250b, and 250c, and each beam splitter can redirect a predetermined amount of the transmitted light beam 110. In one embodiment, each of the redirected predetermined amounts can have a substantially equal power. Alternatively, each redirected amount of light 114 can have a desired power based on system needs.

The waveguide 230 can have a reflective coating 40 covering an interior surface 232 of the waveguide. The reflective coating can be formed using a plating, sputtering, or similar process, as can be appreciated. If the hollow waveguide 230 includes a polymer or other material with a low melting point, the reflective coating may be applied using a low temperature process such as sputtering, electroplating or thermal evaporation. The reflective coating 40 can include one or more layers of metal, dielectrics, or other materials that are substantially reflective at the wavelength of the light as discussed above. In one embodiment, the same reflective coating can be applied to the interior of the waveguide and the surface of the beam splitter. Alternatively, different types of reflective coating may be used.

The plurality of beam splitters 250a, 250b, and 250c can be integrally formed with the waveguide 230 by one of the manufacturing processes described above. Each beam splitter can be located sequentially along the longitudinal length L of the hollow waveguide 230. Each beam splitter can also have an angled reflective surface 252a, 252b, and 252c, respectively, extending a sequentially greater predetermined height H1, H2, and H3, respectively, from the interior surface 232.

The sequentially greater predetermined heights H1, H2, and H3 can allow each reflective surface to redirect a sequentially greater predetermined amount of the remaining light beam such that each predetermined amount has substantially equal power. In this way, the plurality of beam splitters equally splits the transmitted light beam 110 into a plurality of reflected light beams 114 having substantially equal power levels.

It will be appreciated that while the embodiments described herein use sequentially greater predetermined heights H1, H2, and H3 to vary the fractional amount of light reflected, other geometric features, such as width, may also be used to accomplish the same purpose. Additionally, a combination of height and width may be used to vary the predetermined fractional amount of light reflected while maintaining substantially equal power levels in each reflected light beam.

It will be appreciated that as each beam splitter 250a, 250b, and 250c redirects the predetermined amount of light, overall power of the transmitted light beam 110 will decrease by a corresponding amount. To distribute power uniformly along the waveguide 230, the amount of power reflected must be increased as the light propagates along the waveguide. This can be accomplished by varying the height of each successive beam splitter along the propagation direction of the transmitted light beam. Thus, in order for each of the redirected light beams 114 to be substantially equal in power, each successive beam splitter must redirect a proportionally greater amount of the transmitted light beam.

In one exemplary embodiment, with three successive beam splitters 250a, 250b, and 250c, as shown in FIGS. 8-9, the first beam splitter 250a can have a height H1 sufficient to redirect ⅓ of the transmitted light beam, or a height of approximately 50 um. The second beam splitter 250b can have a height H2 sufficient to redirect approximately ½ of the remaining transmitted light beam, or a height of approximately 66 um. Likewise, the third beam splitter 250c can have a height sufficient to redirect approximately 100% of the remaining transmitted light beam, or a height of approximately 150 um. In this way, each of the reflected light beams 114 can have approximately equal power. Similarly, any number of beam splitters can be formed with the waveguide so long as each beam splitter has a sufficient height to reflect a portion of the transmitted light beam with substantially equal power.

Additionally, each of the plurality of beam splitters 250a, 250b, and 250c can be spaced apart longitudinally along the waveguide from one another with sufficient distance L1, L2, and L3, respectively, to allow the transmitted light beam 110 to expand and substantially refill the hollow waveguide prior to the next successive beam splitter. Furthermore, a surface roughness or corrugation in the direction of propagation of the transmitted light beam may be used to increase scattering between the beam splitters in order to allow the light beam to expand and refill the waveguide in the distance between each beam splitter. The amount of light beam divergence is determined by how well the incident beam is collimated and the number of bounces it incurs. For example, an input beam divergence of 1 degree will lead to a reflection every 4.3 mm. Thus after a distance of 4.3 cm, the light will have been reflected 10 times allowing the light to refill the waveguide.

Thus, advantageously, height, shape, and longitudinal positioning of each beam splitter can be selected, and adjusted for optimization at the time of fabrication for manufacturability and reduced crosstalk between waveguides in a system with a plurality of waveguides.

Figure 10:
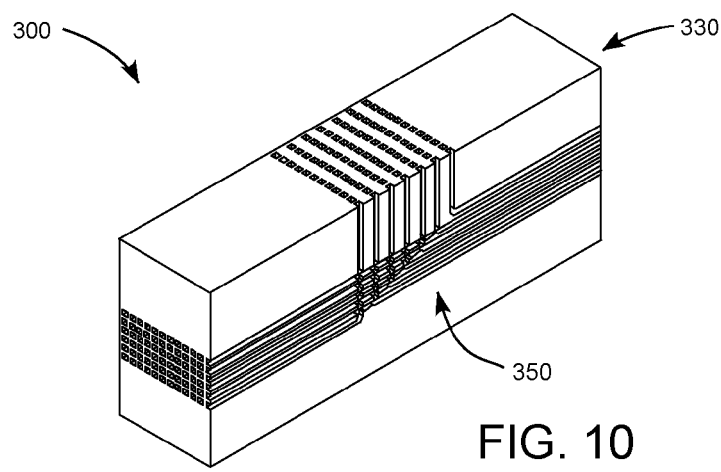
FIG. 10 is a perspective illustration of a system for routing optical signals having a plurality of large core hollow waveguides coupled to a light beam source in accordance with another embodiment of the present invention, and showing a plurality of beam splitters integrally formed with the waveguides.
Figure 11:
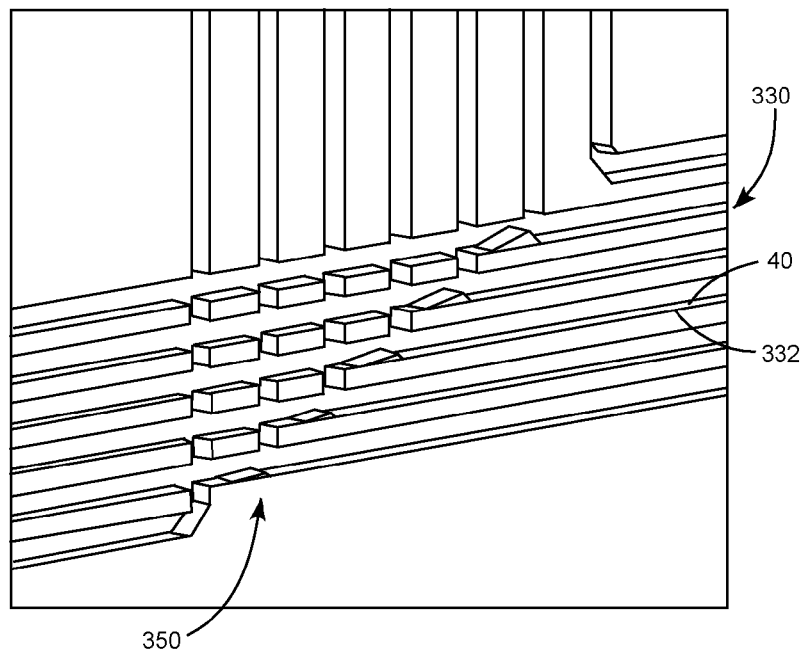
FIG. 11 is a fragmentary perspective illustration of the system of FIG. 10.
Figure 12:
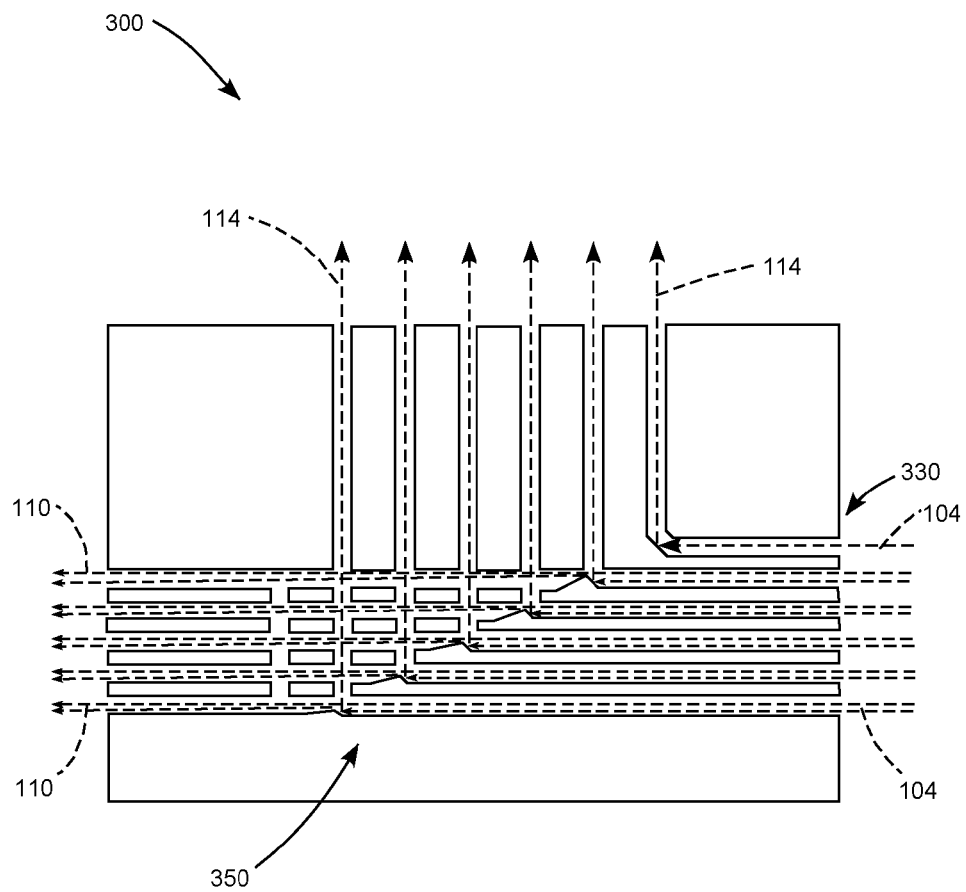
FIG. 12 is a fragmentary side illustration of the system of FIG. 10.

As illustrated in FIGS. 10-12, a system for routing optical signals, indicated generally at 300, is shown in accordance with another embodiment of the present invention. The system 300 can have a plurality of large core hollow metal waveguides, indicated generally at 330, that are similar in many respects to the waveguides 30 and 130 of optical systems 10 and 200 described above and shown in FIGS. 1-9, including having a reflective coating 40 on an interior surface 332. Additionally, each waveguide 330 can include a plurality of beam splitters, indicated generally at 350. Each beam splitter can redirect a successively greater predetermined fractional amount of the light beam with each reflected light beam having substantially equal optical power.

The plurality of waveguides 330 can also be arranged in a layered or stacked configuration. In this arrangement, each layer can have beam splitters 350 with angled reflective surfaces having different heights. Each beam splitter can also be located at a different distance from the transmitting light source (not shown). In this way, each of the reflected beams can be directed toward the center of the receiving waveguide or connector, as best seen in FIG. 12. It will be appreciated that moving each of the beam splitters longitudinally, in the X direction, as well as in height, in the Z direction, helps to keep the reflected beam centered with respect to the receiving waveguide.

Figure 13:
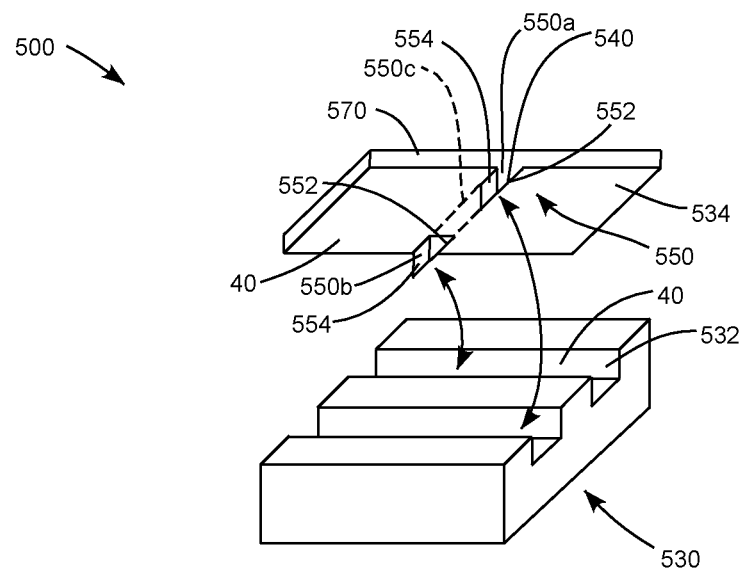
FIG. 13 is perspective illustration of a system for routing optical signals having a plurality of large core hollow waveguides coupled to a light beam source in accordance with another embodiment of the present invention, and showing a plurality of beam splitters integrally formed with the waveguides.
Figure 14:
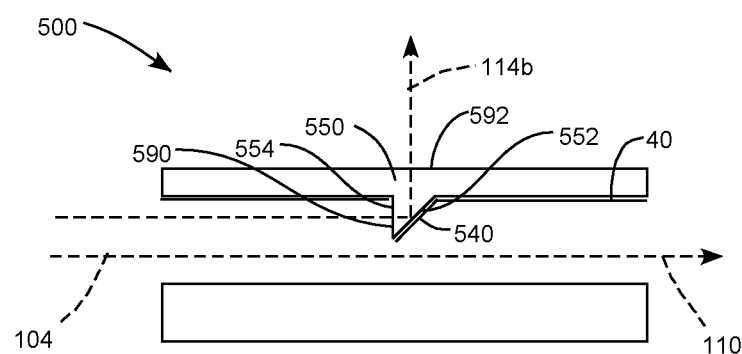
FIG. 14 is a side illustration of the system of FIG. 13.

As illustrated in FIGS. 13-14, a system for routing optical signals, indicated generally at 500, is shown in accordance with another embodiment of the present invention. The system 500 can have at least one large core hollow metal waveguides, indicated generally at 530, similar in many respects to the optical systems 10, 200, and 300 described above and shown in FIGS. 1-12. Additionally, the system 500 can include at least one beam splitter, indicated generally at 550.

In this embodiment, the beam splitter 550 can be located on an upper surface 534 of the waveguide 530 and extend downward into the waveguide so as to reflect an upper portion 114b of the transmitted light beam 110. In one aspect, the beam splitter can be integrally formed with a cover plate 570 of the waveguide.

The cover plate 570 can be formed of a transparent material or a material with optical properties that produce low transmission loss. In one aspect, the cover plate can have a plurality of beam splitters 550a and 550b spaced apart the distance between waveguides. In another aspect, the cover plate can have a single beam splitter, indicated by dashed line 550c extending across the cover plate and operational with a plurality of waveguides.

The cover plate 570 can have a reflective surface 40 along the waveguide 530. The beam splitter can have an angled reflective surface 552 and a vertical section 554. The angled reflective surface can have a reflective coating 540. In the case where the angled reflected surface 550 is segmented into 550a, 550b, etc, the width of the segments can be also varied to control the amount of reflected light. The vertical section can be formed of a substantially optically transparent material at the wavelength of the light beam 110 so as to allow light to transmit through the vertical section and be reflected by the angled reflective surface out of the waveguide 530.

Additionally, the cover plate 570 can have anti-reflective coatings on the interface surfaces 590 and 592 through which the light beam passes. The anti-reflective coatings can reduce reflection losses at the interface between the waveguide and the beam splitter, and the beam splitter and the connector.

Figure 15:
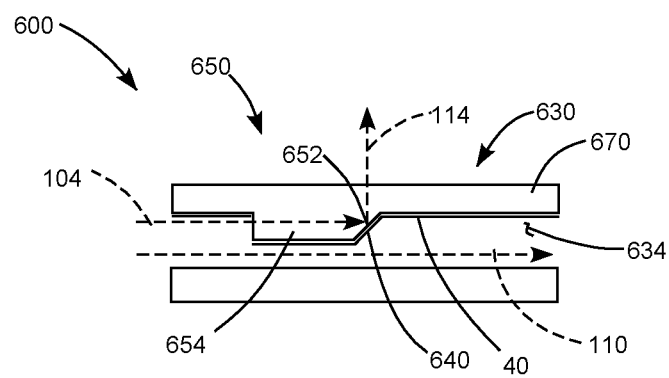
FIG. 15 is a side illustration of a system for routing optical signals having a plurality of large core hollow waveguides coupled to a light beam source in accordance with another embodiment of the present invention.

As illustrated in FIG. 15, a system for routing optical signals, indicated generally at 600, is shown in accordance with another embodiment of the present invention. The system 600 can have at least one large core hollow metal waveguide, indicated generally at 630, similar in many respects to the optical systems 10, 200, 300, and 500 described above and shown in FIGS. 1-14. Additionally, the system 600 can include at least one beam splitter, indicated generally at 650.

The beam splitter 650 can be located in a cover plate 670. The splitter can have an angled reflective surface 652 and a vertical section 654. The angled reflective surface can have a reflective coating 640. The vertical section can be formed of a substantially optically transparent material at the wavelength of the light beam 110 to allow a desired amount of the light beam to be transmitted through the vertical section and reflected by the angled reflective surface out of the waveguide.

The vertical section 654 can have a relatively longer longitudinal length of transparent material that fits within the channel 634 of the waveguide 630. Advantageously, the longer length of the vertical section can help to secure the cover plate 670 to the waveguide, and more precisely align the angled reflective surface 652 of the beam splitter 650.

Figure 16:
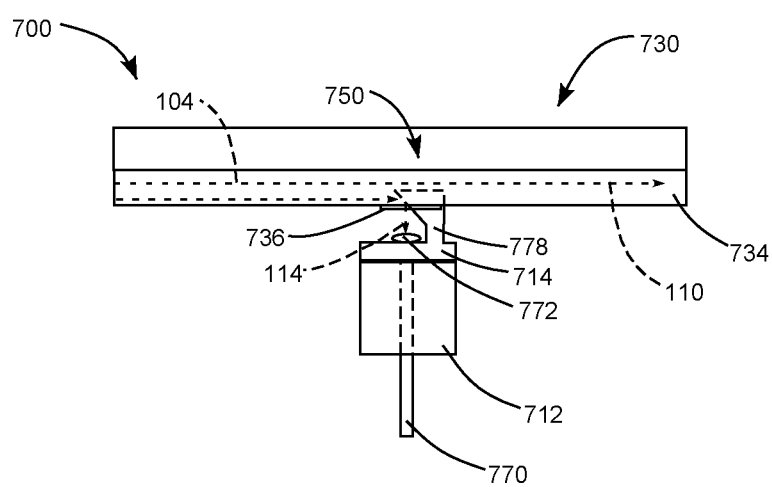
FIG. 16 is a side illustration of a system for routing optical signals having a plurality of large core hollow waveguides coupled to a light beam source in accordance with another embodiment of the present invention.

As illustrated in FIG. 16, a system for routing optical signals, indicated generally at 700, is shown in accordance with another embodiment of the present invention. The system 700 can have at least one large core hollow metal waveguide, indicated generally at 730, similar in many respects to the optical systems 10, 200, 300, 500, and 600 described above and shown in FIGS. 1-15. Additionally, the system 700 can include at least one beam splitter, indicated generally at 750.

The beam splitter 750 can be optically coupled to the mating connector 712. The beam splitter can be inserted into the waveguide 730 through an aperture 736 and extend into the channel 734 of the waveguide therefrom. The beam splitter can redirect a predetermined amount 114 of the transmitted light beam 110 to an optical fiber 770 through a micro-lens 772 coupled to the beam splitter and positioned outside the waveguide.

The beam splitter, micro-lens, and optical fiber together can form a connector 712 and can be coupled and aligned to the waveguide by a mechanical fastener such as a stainless steel, mechanical transfer (MT) guide pin 778. It will be appreciated that other attachment and alignment mechanisms can also be used and that such mechanisms may actively or passively align the beam splitter to the waveguide. For example, in many cases, the incoming light 104 may be transferred into the wave guide 730 via the optical connector 712. In this case, the waveguide alignment structure 714 that positions the optical connector can be co-formed with the waveguide 730 and angled beam splitter 750. In this way, other elements of the optical routing systems described herein can also be integrally formed with the waveguide to simplify the precise positioning processes necessary for accurately placing the optical routing elements.

Figure 17:
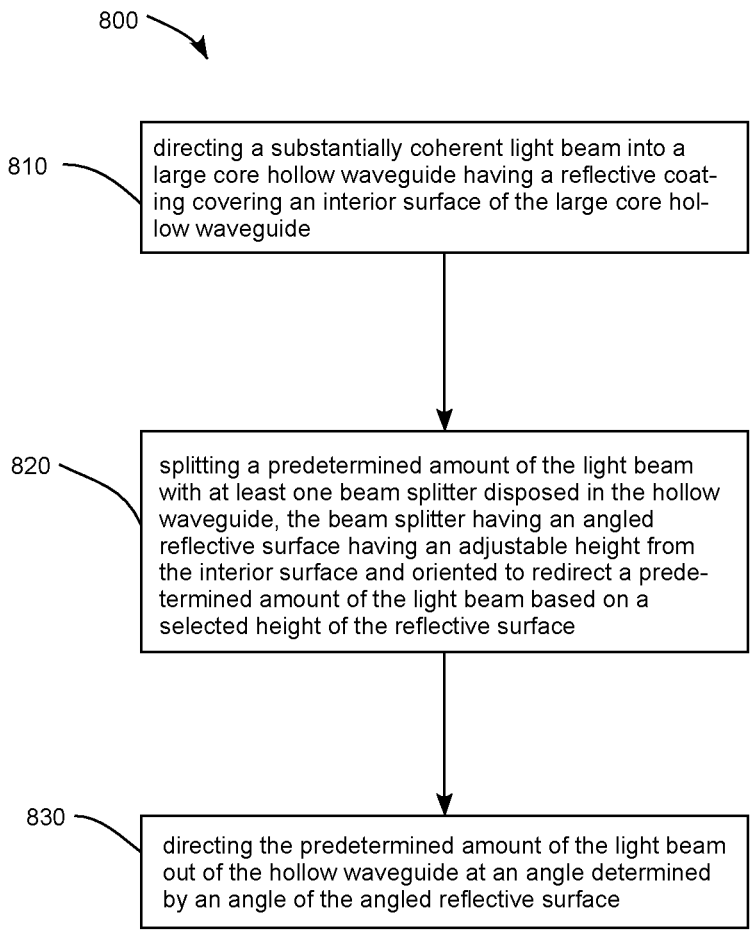
FIG. 17 is a flow chart of a method for routing optical signals in accordance with another embodiment of the present invention.

Illustrated in FIG. 17 is a method for routing optical signals 800. The method includes directing a substantially coherent light beam into a large core hollow waveguide, shown at 810. The waveguide can have a reflective coating covering an interior surface of the large core hollow waveguide. A predetermined amount of the light beam can be redirected with at least one beam splitter disposed in the hollow waveguide, shown at 820. The beam splitter can have an angled reflective surface with an adjustable or selectable predetermined height from the interior surface. The angled reflective surface can be oriented to redirect a predetermined amount of the light beam based on a selected height of the reflective surface. The predetermined amount of the light beam can be directed out of the hollow waveguide at an angle determined by an angle of the angled reflective surface, shown at 830.

The method further includes splitting the transmitted light beam into a plurality of split light beams with a plurality of beam splitters disposed sequentially along the hollow waveguide. Each split light beam can have substantially equal power. Additionally, each beam splitter can have an angled reflective surface with the selected height of each angled reflective surface extending a sequentially greater distance from the interior surface relative to the previous beam splitter. Each reflective surface can redirect a sequentially greater predetermined amount of the remaining light beam to enable each of the split beams to have a substantially equal power level.

Figure 18:
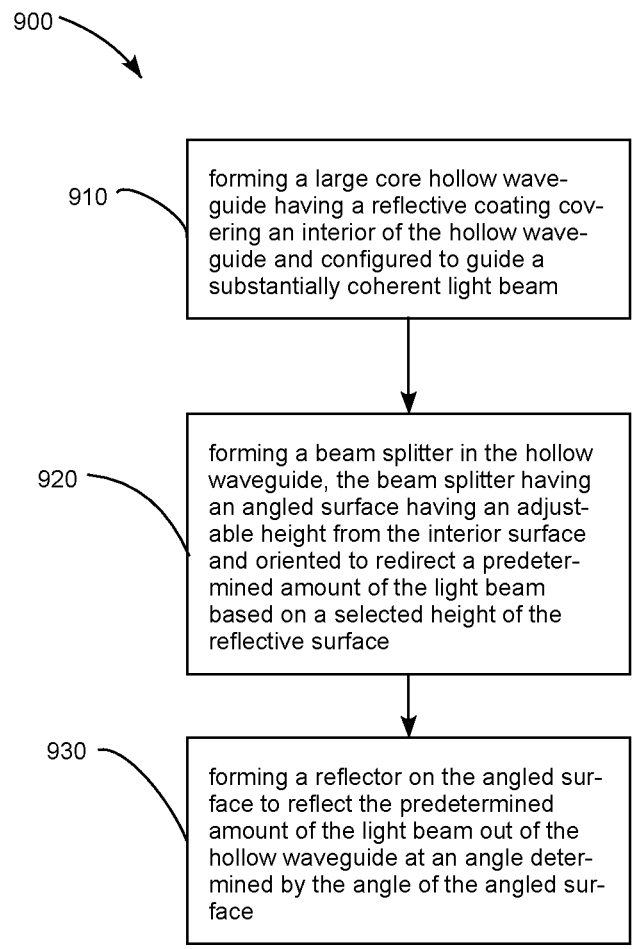
FIG. 18 is a flow chart of a method for making an optical signal routing system in accordance with another embodiment of the present invention.

Illustrated in FIG. 18 is a method for making an optical signal routing system 900. The method includes forming a large core hollow waveguide having a reflective coating covering an interior of the hollow waveguide and configured to guide a light beam, shown at 910. A beam splitter can be integrally and monolithically formed in the hollow waveguide in a single fabrication step, such as injection molding, shown at 920. The beam splitter can have an angled surface having a selected height from the interior surface. The angled reflective surface can be oriented to redirect a predetermined amount of the light beam out of the waveguide based on a selected height of the reflective surface. A reflector can be formed on the angled surface to reflect the predetermined amount of the light beam out of the hollow waveguide at an angle determined by the angle of the angled surface, shown at 930.

The method can also include forming a plurality of beam splitters disposed sequentially along the hollow waveguide. Each beam splitter can have an angled reflective surface with the selected height extending a sequentially greater distance from the interior surface relative to the previous beam splitter. Each reflective surface can redirect a sequentially greater predetermined fractional amount of the remaining light beam to enable each of the split beams to have a substantially equal power level.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for routing optical signals, comprising:
   a large core hollow waveguide having a reflective coating covering an interior surface of the hollow waveguide and configured to guide a light beam; and
   at least one area based beam splitter integrally formed with the hollow waveguide and having an angled reflective surface with a selectable height (H) relative to the interior surface and oriented to redirect a predetermined amount of the light beam based on the height of the angled reflective surface.

2. A system as in claim 1, wherein the angled reflective surface extends upward from a lower inner surface of the hollow waveguide and reflects a lower portion of the light beam.

3. A system as in claim 1, wherein the angled reflective surface extends downward from an upper inner surface of the hollow waveguide and reflects an upper portion of the light beam.

4. A system as in claim 1, wherein the at least one beam splitter further includes a plurality of beam splitters integrally formed sequentially along the hollow waveguide, each beam splitter having an angled reflective surface extending a sequentially greater predetermined height (H1, H2, H3) from the interior surface, and each reflective surface redirects a sequentially greater predetermined amount of the remaining light beam with each predetermined amount having substantially equal power.

5. A system as in claim 4, wherein each of the plurality of beam splitters is spaced apart from one another a sufficient distance (L1, L2, L3) to allow the light beam to diffract and substantially refill the hollow waveguide prior to the next beam splitter.

6. A system as in claim 1, wherein the angled reflective surface is disposed at an angle between approximately 30 and 60 degrees with respect to a direction of travel of the light beam in the hollow waveguide and redirects the predetermined amount of the light beam out of the hollow waveguide at an angle of between approximately 60 and 120 degrees with respect to the direction of travel of the light beam in the hollow waveguide.

7. A system as in claim 1, further comprising a substantially transparent aperture within the hollow waveguide configured to enable substantially all of the light beam reflected by the angled reflective surface to be transmitted through the aperture.

8. A system as in claim 1, wherein the reflective coating covering the interior surface of the hollow waveguide is selected from the group consisting of a reflective metal, a dielectric film, and a dielectric film stack, and combinations thereof.

9. A system as in claim 1, wherein the large core hollow waveguide has a cross sectional dimension that is greater than 50 times a wavelength of the light beam.

10. A system as in claim 1, further comprising an aligning structure integrally formed with the at least one area based beam splitter.

11. A method for routing optical signals in the system of claim 1, comprising:
    directing a light beam into the large core hollow waveguide;
    splitting a predetermined amount of the light beam with the angled reflective surface of the at least one beam splitter disposed in the hollow waveguide; and
    directing the predetermined amount of the light beam out of the hollow waveguide at an angle determined by an angle of the angled reflective surface.

12. A method as in claim 11, further comprising:
    splitting the light beam into a plurality of split light beams having substantially equal power with a plurality of beam splitters disposed sequentially along the hollow waveguide, each beam splitter having an angled reflective surface with a selected height extending a sequentially greater distance from the interior surface relative to the previous beam splitter, and each reflective surface redirecting a sequentially greater predetermined amount of the remaining light beam to enable each of the split light beams to have a substantially equal power level.

13. A method for making an optical signal routing system in the system of claim 1, comprising:
    forming the large core hollow waveguide with the reflective coating covering the interior of the hollow waveguide to guide a substantially light beam;
    forming the beam splitter with the height adjustable angled surface in the hollow waveguide to redirect a predetermined amount of the light beam based on the selected height of the reflective surface; and
    forming the reflector on the angled surface to reflect the predetermined amount of the light beam out of the hollow waveguide at an angle determined by the angle of the angled surface.

14. A method as in claim 13, further comprising:
    forming a plurality of beam splitters disposed sequentially along the hollow waveguide, each beam splitter having an angled reflective surface with the selected height extending a sequentially greater distance from the interior surface relative to the previous beam splitter, and each reflective surface redirecting a sequentially greater predetermined amount of the remaining light beam to enable each of the split light beams to have a substantially equal power level.

15. A system as in claim 13, wherein the hollow waveguide and the at least one beam splitter are formed together by a process selected from the group consisting of injection molding, embossing, etching, powder blasting, and combinations thereof.

16. A system as in claim 1, wherein the at least one beam splitter comprises:
    a given beam splitter with an angled reflective surface extending a predetermined height from the interior surface; and
    another beam splitter with an angled reflective surface extending a predetermined height from the interior surface, wherein the predetermined height of the angled reflective surface of the given beam splitter is different from the predetermined height of the angled reflective surface of the another beam splitter.

17. A system as in claim 1, wherein the at least one beam splitter comprises:
    a given beam splitter oriented to redirect a predetermined amount of the light beam; and
    another beam splitter oriented to redirect a predetermined amount of the light beam, wherein the predetermined amount of the light beam redirected by the given beam splitter is different from the predetermined amount of the light beam redirected from the another beam splitter.

18. A system as in claim 1, wherein the predetermined amount of the light beam is less than about half of the light beam.

* * * * *